(12) United States Patent
Davidson

(10) Patent No.: US 6,692,784 B2
(45) Date of Patent: Feb. 17, 2004

(54) PASTEURIZED EGGS

(76) Inventor: L. John Davidson, 36A Salem Rd., Atkinson, NH (US) 03811

( * ) Notice: Subject to any disclaimer, the term of this patent is extended or adjusted under 35 U.S.C. 154(b) by 102 days.

(21) Appl. No.: 10/084,444

(22) Filed: Feb. 28, 2002

(65) Prior Publication Data

US 2002/0090429 A1 Jul. 11, 2002

Related U.S. Application Data

(60) Provisional application No. 60/271,726, filed on Feb. 28, 2001, provisional application No. 60/271,746, filed on Feb. 28, 2001, provisional application No. 60/314,631, filed on Feb. 28, 2001, and provisional application No. 60/335,031, filed on Nov. 2, 2001.

(51) Int. Cl.[7] .............................. A23L 1/32; A23B 5/00
(52) U.S. Cl. ...................... 426/298; 426/300; 426/521; 426/614
(58) Field of Search ................. 426/614, 521, 426/298, 300

(56) References Cited

U.S. PATENT DOCUMENTS

| | | | |
|---|---|---|---|
| 3,985,900 A | * | 10/1976 | Stephan |
| 5,431,939 A | | 7/1995 | Cox et al. |
| 5,843,505 A | | 12/1998 | Davidson |
| 6,004,603 A | * | 12/1999 | Vandepopuliere et al. |

* cited by examiner

Primary Examiner—Anthony J. Weier

(57) ABSTRACT

There is provided a process for pasteurizing in shell chicken eggs (2) carried in stacks (1) by placing the eggs in a heated fluid bath (4) having a temperature of between about 128 to 145 degrees F., allowing the eggs to dwell in the heated fluid bath until there is a log reduction of at least 4.6 of any Salmonella bacteria within the eggs, removing the eggs from the heated liquid bath and into a gaseous atmosphere (26), and contacting the eggs with an antibacterial fluid (28) containing an antibacterial agent. Preferably, the eggs are thereafter contacted with a sealant such as wax. In the gaseous atmosphere the eggs further pasteurize to at least a 5 logs reduction of the bacteria by way of residual heat in the eggs. During cooling in the gaseous atmosphere, the eggs suck the antibacterial fluid into the eggs between the inside of the shells and the membranes and provide antibacterial barriers in the eggs.

74 Claims, 3 Drawing Sheets

PASTEURIZED EGGS

RELATED APPLICATIONS

This application claims priority to and is a continuation of U.S. Provisional Patent Application Serial Nos. 60/271,726, filed Feb. 28, 2001; 60/271,746, filed Feb. 28, 2001; 60/314,631, filed Aug. 27, 2001 and 60/335,031, filed Nov. 2, 2001.

BACKGROUND OF THE INVENTION

Pasteurized eggs are relatively new items of commerce in the United States, and indeed, throughout the world. While the art has sought for sometime to devise effective methods for pasteurizing eggs, as described in detail in U.S. Pat. No. 5,843,505, which patent is incorporated herein by reference and relied upon for disclosure, until the existence of the process described and claimed in that patent, pasteurizing of eggs had not been successful either from a commercial point of view or a functionality point of view. Functionality refers to a group of properties of eggs including yoke index, Haugh units, yoke strength, angel cake volume, sponge cake volume, foam stability, whippability, and lysozyme properties. All of these functionalities are well known to the art and are described in detail in the above-noted patent and, for conciseness herein will not be described in detail. However, for example, the angel cake volume is sensitive to egg white protein damage. Heat damage to the protein will increase whipping time and decrease cake volume. Foam stability is a measure of the volume of foam of whipped egg whites. Heat damaged white protein will provide less foam volume and therefore is less desirable in making meringues and the like. Haugh units also measure the foam stability of whipped egg whites and is important in many uses of eggs for baking and cooking. Yoke index is a measure of the yoke height versus the yoke width. When breaking a fresh egg into a pan for frying, if the yoke index is not proper, the yoke will look flat and unappealing in a sunny side up fried egg. Yoke strength is a measure of the strength of the yoke membrane to retain the yoke and is important when frying eggs.

The above-noted U.S. Patent describes and claims processes where eggs may be pasteurized in keeping with the relatively new U.S. Food and Drug Administration definition of pasteurized eggs, which includes a requirement that any Salmonella species in the egg is reduced by an amount equal to at least 5 logs. Those processes are also carried out such that the pasteurized eggs do not have substantial loss of functionality, particularly in regard to the Haugh units, as well as the yoke index and yoke strength.

As a result of the processes described and claimed in that patent, substantial commercialization of pasteurized eggs has now taken place.

Very basically, the processes entail heating raw eggs in a heat transfer medium at certain temperatures within certain parameter lines of a graft shown in that patent and for a time sufficient that a Salmonella species which may be present in the eggs is reduced by an amount of at least 5 logs. In one example of that patent, the internal temperature of the yoke is brought to 133° F. and maintained at that temperature by addition of heated or cooled water to a pasteurizer until any Salmonella bacteria in the egg is reduced by at least 5 logs. Depending upon the particular pasteurizer, the history of the raw eggs being pasteurized, the temperature of the raw eggs entering the pasteurizer and their size, ambient temperatures around the pasteurizer, as well as other factors, a total pasteurizing time of somewhere about 64 minutes or more is required. Of course, the time of dwell of the central portion of the yoke of the eggs being pasteurized will be considerably less than that in accordance with the parameter lines A and B of the graft in that patent. However, the 64 minutes so called total processing time, including the time required to bring the yokes to the temperatures required by that patent for pasteurization, substantially increases the cost of production of pasteurized eggs. It would, of course, be of a substantial advantage to the art to considerably shorten the total processing time required for such pasteurization.

Also, it was found that eggs, which are commercially pasteurized according to that patent, do not have the extended shelf life of the eggs pasteurized in the examples of that patent. Indeed, in commercial pasteurization of the eggs, it was found that a substantial percentage of the pasteurized eggs, even with proper traditional storage conditions, unexpectedly had a shelf life of only about 21 days before rot began to appear in the pasteurized eggs. This, of course, was of concern in regard to the commercial operation, and it was well recognized that this is a disadvantage in the commercial process of pasteurizing eggs and that it would be of substantial advantage to the art to considerably extend the shelf life of the commercially pasteurized eggs.

The above-noted patent also discloses that the heat transfer medium for pasteurizing the eggs may be heated to more than one temperature during the pasteurizing process. However, as a practical matter, having the heat transfer medium, e.g. water, at different temperatures, provides advantages and more efficiency, but requires a series of separate pasteurizing tanks, along with the added capital costs. This also requires placing large volumes of eggs in one tank, removing the eggs from that tank, and placing and removing the eggs from a succeeding tank or tanks. It was determined that using multiple tanks and the apparatus for moving the eggs in and out of the tanks not only complicated the pasteurizing process, but substantially increased the cost thereof. In this latter regard, one of the hazards of pasteurizing eggs is that if during handling eggs break in a pasteurizing tank, then for food safety reasons, the process must be stopped, the tank drained, well-cleaned, and replenished with hot water. It was therefore recognized that it would be a substantial advantage to carry out the pasteurizing process at multiple temperatures but without the necessity of using multiple tanks. This would provide the advantages disclosed in the aforementioned patent that multiple temperatures of pasteurization can decrease the total time required for pasteurization and, thus, substantially reduce the pasteurization costs.

Further, the prior art considered it important that the eggs be removed from the pasteurizer as soon as a 5 log reduction of any Salmonella in the eggs is achieved. This is in order to prevent unwanted additional pasteurization, i.e. above the 5 logs safety requirement, which would adversely affect the functionality of the pasteurized eggs. However, this rather rigid requirement in the pasteurization, as it was perceived by the art, made it difficult to precisely achieve that 5 log reduction, while at the same time retaining the functionality of fresh raw eggs, without very careful control of the pasteurization process, along with expensive and extensive control devices. It would, of course, be of an advantage to the art to pasteurize eggs without such expensive control.

SUMMARY OF THE INVENTION

In regard to the above-discussed advantage of reducing the total pasteurization time, it was discovered that the total pasteurization time could be reduced by certain uses of multi-temperatures in the pasteurization process. These certain multi-temperatures include at least three different temperatures or temperature ranges, and especially where a first temperature(s) encountered by the eggs is at a higher temperature(s), a second temperature(s) encountered by the eggs is at a preferred pasteurization temperature(s), and a third temperature(s) encountered by the eggs is again at a higher temperature(s). More precisely, the first temperature (s) should be between about 139° F. and 146° F., the second temperature(s) should be between about 130° F. and less than 135° F., and the third temperature(s) should be between about 135° F. and 138° F. As a subsidiary discovery in this regard, it was found that, however, the time in which the eggs dwelled at the three different temperatures or temperature ranges must be different with a shorter time at the first higher temperature(s), a longer time at the second more desired pasteurization temperature(s), and a shorter time at the higher third temperature(s).

As another discovery in this regard, it was found, contrary to the understanding in the art, that the eggs need not be pasteurized to at least a 5 logs reduction of Salmonella in the pasteurizer, e.g., a pasteurization water bath. Prior to the present invention, it was considered essential that the eggs reach a 5 logs reduction in the pasteurization water bath and after the 5 logs reduction, the eggs are immediately removed from the pasteurization bath and placed in a chilled water bath to prevent further heating, pasteurization, and deterioration of functionality that would be caused by further pasteurization. It has been found, contrary thereto, that the eggs can be removed from the pasteurization bath when reaching only about a 4.6 logs, e.g., a 4.8 logs reduction, especially about a 4.75 logs reduction, and that residual heat in the eggs will achieve the 5 logs reduction after the eggs are removed from the pasteurizer. When the eggs are immediately passed into a gaseous atmosphere, e.g., air, after removal from the pasteurizer, pasteurization will continue to occur until the eggs reach a temperature below about 128° F. Thus, during that dwell in the gaseous atmosphere, additional pasteurization will take place and will reach at least a 5 log reduction.

As another important discovery, it was found that in a conventional elongated pasteurizing tank, even though the water therein is a single body of water, it is possible to generate different temperature zones along a major axis of that tank such that the temperatures noted above could be achieved. This is because heat generated in localized zones within the tank can form zones of different temperatures by way of vertical convection of the water in the tank.

As another discovery in this regard, it was found that the different temperature zones can be substantially sharpened into distinct temperature compartments having different temperatures by use of a plurality of series of transverse jets spaced apart along a major axis of the tank. These jets cause a jet fluid to pass from the bottom of the tank toward the top of the tank and provide something of a jet fluid wall for containment of the water at the different temperatures.

Also, it was found that after pasteurization of the eggs in the pasteurizer, and when the eggs are in the gaseous atmosphere, mentioned above, that the eggs should be contacted with an antibacterial fluid containing an antibacterial agent. Thus, any unwanted bacteria, such as rot bacteria and air borne pathogens, which might penetrate the eggs during cooling in the gaseous atmosphere, are substantially killed or very significantly reduced in number by the antibacterial agent in the antibacterial fluid, such that the eggs are will rot during long term refrigerated storage. In deed, this is applicable to protect from rot bacteria any at least partially pasteurized egg that is in a heated condition, that is applying to that egg an antibacterial fluid containing an antibactericide.

Thus, briefly stated, in one regard, the present invention provides a method of pasteurizing in-shell chicken eggs by placing the eggs in a heated fluid having a temperature between about 128° F. and 146° F. The eggs are allowed to dwell in the heated fluid until there is a log reduction of at least 4.6 of any Salmonella bacteria within the eggs. The eggs are removed from the heated fluid and placed in a gaseous atmosphere. Thereafter, the eggs are contacted with an antibacterial fluid containing an antibacterial agent, so as to prevent rot in the eggs, as briefly mentioned above and explained in more detail below.

More preferably, the eggs are placed in the heated fluid where the heated fluid has a first temperature(s) of about 139° F. to 146° F., a second temperature(s) from about 130° F. to less than 135° F., and a third temperature(s) from about 135° F. to 138° F. The first, second, and third temperatures of the heated fluid are maintained in separate zones of the heated fluid. The eggs are allowed to pass through the first, second, and third temperatures in a time period which causes a log reduction of at least 4.6 and preferably at least 4.75 of any Salmonella bacteria in the eggs. The eggs are removed from the heated fluid and passed into the gaseous atmosphere where the eggs are allowed to cool and further pasteurize so as to reach a log reduction of at least 5.0.

In a preferred form of the invention, the heated fluid is water and the water is contained in a tank, especially, an elongated tank through which the eggs traverse from an entrance end of the tank to a middle zone of the tank and to an exit end of the tank. Near the bottom of the tank a plurality of jets are disposed through which a jet fluid is passed. Some of the jets are arranged transverse to a major axis of the tank and are spaced apart such that the jet fluid rises vertically to at least near the top of the tank to provide a jet fluid wall near each of the spaced apart series of jets. This provides more sharply defined different temperatures along the major axis of the tank, particularly for increasing the speed and especially the precision of pasteurization and to reduce the loss of functionally.

In a further preferred form of the invention, not only is the antibacterial fluid contacted with the eggs after the eggs exit the pasteurizing tank, but the antibacterial fluid is contacted with mechanical equipment handling the eggs subsequent to the eggs exit of the pasteurizing tank. This avoids viable amounts of bacteria on any of the mechanical equipment from entering into the eggs.

In another form of the invention, after the eggs have been contacted, e.g. sprayed, with antibacterial fluid, the eggs are at least partially coated with a sealant to prevent entrance of bacteria into the eggs after processing.

In another form of the invention, the eggs are allowed to dwell in the heated fluid for a time sufficient to cause at least a 6 and up to 12 logs reduction of the Salmonella bacteria. This will produce a partially coagulated or cooked egg which is useful in the fast-food and nursing industries, since the egg is not only highly reduced in any possible Salmonella, but will cook much more quickly in preparing, for example, sunny side up eggs.

DETAILED DESCRIPTION OF THE INVENTION

Figure 1:
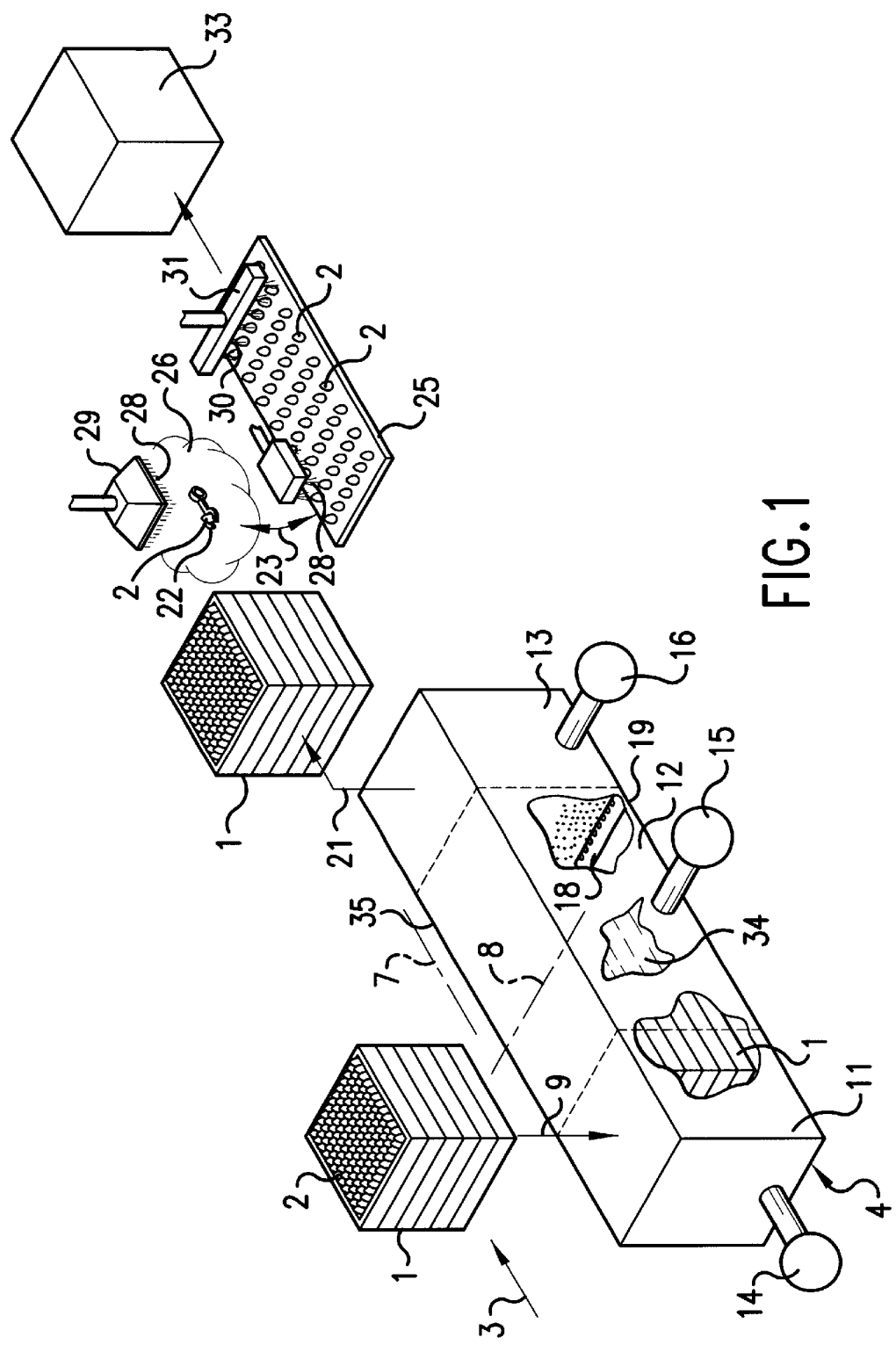
FIG. 1 is a diagrammatic illustration of the overall process.

As noted above, there are several different aspects of the invention, each one of which is important, but together these aspects provide not only the important reduction in time and costs required for pasteurizing eggs, but equally importantly considerably extend the shelf-life of the eggs, and this latter feature of the invention is most important. In the process described and claimed in the above-noted patent, pasteurization was carried out in the examples by way of a single water tank. After each pasteurization of a plurality of eggs in the water tank, for food safety, the tank would be drained, cleaned, re-filled with water, and re-heated for a further pasteurization. As a result, any bacterial contamination of water in the tank from a pasteurization would be removed prior to further processing in a further pasteurization. However, when the process is put into commercial operation, with commercial size tanks involved, e.g. 3,000 to 4,000 gallons, it is very costly and impractical to empty such tanks after each pasteurization of a lot of eggs. Indeed, in a commercial operation, for commercial viability, a series of lots of eggs must be passed through the pasteurizing tank while the water in that tank remains suitable for many subsequent pasteurizations.

It was discovered that the water in the commercial tanks, even though heated to higher temperatures, nevertheless could support growth of certain bacteria, especially rot causing bacteria. Further, in that prior process, since the eggs were pasteurized to a 5 log reduction of Salmonella before exiting the pasteurizing tank, it was necessary to place the eggs, immediately after exiting the pasteurizing tank, into a chilling water tank in order to reduce the internal temperature of the eggs to below that temperature where deterioration of the functionality of the eggs would occur, generally speaking below about 128° F. Here again, the chilled water of the chilling tank, for commercial operation, is not changed with each lot of eggs. It is essentially reused for many pasteurizations and chillings. It was discovered that rot bacteria proliferate in the chilling water tank. As the eggs cooled in the chilling water tank, water from the pasteurizing bath, containing rot bacteria, and water from the chilling bath, containing rot bacteria, are sucked through the porous shells of the eggs and into the eggs themselves. This is because at the temperatures of the pasteurizer most of the natural sealant in an eggshell is removed, i.e. the sealant which seals the pores in an eggshell. Since the pores are open during at least part of the pasteurization and during the chilling, those exposed pores allow water from the pasteurizing bath and chilling bath to be sucked into the eggs during cooling in the chilling bath. Since those waters could contain rot bacteria, upon storage, the pasteurized eggs were subject to considerable premature rotting.

Further, it was found that even though bactericides are placed in the pasteurizing bath and in the chilling water, e.g. hydrogen peroxide, so as to substantially reduce the numbers of rot bacteria in those waters, those bacteria could not be totally eliminated and upon long term storage, significant experiences of rot of the pasteurized eggs occurred in about three weeks. Thus, while the use of bactericides in the pasteurizing water and chilling water are helpful, it does not entirely solve the problem.

Thus, one of the broader aspects of the invention is the discovery that the chilling bath must be eliminated in order to avoid the probability of rot of the pasteurized eggs on long term refrigerated storage. However, with the chilling bath eliminated, its function of stopping further pasteurization beyond 5 logs which would increase deterioration of the functionality of the eggs, especially the albumen thereof, is also eliminated. The question became how can the further deterioration of the functionally be quickly and effectively stopped without the chilling bath.

As another discovery of the present invention, it was determined that with the elimination of the chilling bath, the eggs could be adequately cooled in a gaseous atmosphere, for example ambient air, so as to stop further pasteurization and decreased functionality. However, as a subsidiary discovery in this regard, it was found that in order to cool the eggs in air and not exceed, substantially, the 5 log reduction of pasteurization, the eggs must be removed from the pasteurizer prior to reaching a 5 log reduction, contrary to the art accepted process. More specifically, it was found that with usual pasteurization temperatures of somewhere in the range of 133° F., the eggs could be removed from the pasteurizer after reaching at least about 4.6 logs, and the residual heat of the eggs while dwelling in the gaseous atmosphere would continue the pasteurization to achieve at least a 5 log reduction. This not only eliminated the need for the deleterious and expensive chilling bath, but in turn and just as importantly, considerably shortened the time required for pasteurization of the eggs in the pasteurizer, which is a decidedly commercial advantage.

As yet a further broader discovery in this regard, it was found that when the eggs are allowed to dwell in the gaseous atmosphere and cool for further pasteurization as described above, the eggs suck into the eggs the gaseous atmosphere, just as the eggs had sucked in the chilling water of the chilling bath. While the gaseous atmosphere could be an antibacterial atmosphere, through the use of, for example, ozone, chlorine, bromine, or the like, it was found that this approach is relatively expensive, difficult to contain and unreliable for consistent results. Thus, as a subsidiary discovery in this regard, it was found that the gaseous atmosphere, such as air, even though somewhat contaminated with ambient rot and/or pathogen organisms, is nevertheless acceptable so long as when the eggs are withdrawn from the heated fluid of the pasteurizer and into the gaseous atmosphere and while their internal heat (temperature) is greater than the ambient temperature, the eggs are contacted with an antibacterial fluid containing an antibacterial agent. Thus, as the eggs begin to cool in the gaseous atmosphere and suck into the eggs the surrounding atmosphere, the antibacterial fluid will pass into the eggs. That antibacterial fluid will be disposed between the inside of the shells and the outer membranes of the eggs and, especially, in the air pockets (sacks) at the large ends of the eggs. During pasteurization the air pockets are considerably reduced, but upon cooling again expand. Thus, as an egg cools, the antibacterial fluid is pulled into the air pocket of that egg. Any rot and/or pathogen bacteria that might be in the ambient gaseous atmosphere will be substantially killed or rendered non-viable by the antibacterial agent in the antibacterial fluid.

As a further broader discovery, as noted above, the loss of the natural sealant of the eggs during pasteurizing provides an opportunity, during post pasteurization and storage, for ambient rot or pathogenic bacteria to enter the eggs through the porous shells. Thus, as a further discovery, it was found that after the antibacterial fluid is applied, it is preferable that the eggs be at least partially coated with a sealant, for example, waxes, which replaces the natural sealant of the eggs lost during pasteurization. This prevents ambient bacteria from entering the eggs during storage.

Also, as a broader discovery, it was found that the sealant, preferably, will also contain an antibacterial agent, so that the sealant, e.g. wax, used to replace the natural sealant of the eggs lost during pasteurization will not only form a barrier to ambient rot and/or pathogenic bacteria but an antibacterial barrier to that bacteria.

As yet a further broader subsidiary discovery, it was found that since the chilling bath must be eliminated, this created opportunities for variations in the log reduction in the pasteurized eggs by removing the eggs with as little as only at least about a 4.6 log reduction from the pasteurizing bath, as noted above. However, in addition, it was found that the eggs could be pasteurized to a much higher log reduction, e.g., 6, 8, 9, or even 12 log reduction. While this provides an exceptionally safe egg, such higher log reductions do substantially increase the loss of functionality of the eggs. The eggs are at least partially cooked during the higher log reductions. However, it was found that up to about a 12 log reduction still left the eggs in a substantially fluid state, i.e. such that the eggs could be broken and scrambled or fried in the conventional manner. However, such eggs will be cooked in the conventional manner, e.g. scrambled or fried, in a very short time, e.g., about one-half of the usual cooking time. This was found to be particularly useful for fast-food restaurants where the time of cooking is important to the economics of preparing the eggs and the increased safety of the eggs is important for liability purposes. It is also important for health care facilities, e.g., nursing homes, where ingestion of Salmonella by a patient could be disastrous.

The general overall process is diagrammatically illustrated by FIG. 1. In that Figure, a stack 1 of eggs 2 which may contain many dozens of eggs is moved in a direction 3 toward a pasteurizer, e.g. a tank, generally, 4 which is shown in the example of FIG. 1 as an elongated tank having a major axis 7 and a minor axis 8. The stack 1 of eggs 2 is moved into the pasteurizer 4 as shown by arrow 9 and passed through the pasteurizer 4 along the major axis 7. In a preferred form of the invention, described in detail below, the pasteurizer 4 has three zones or compartments, shown in FIG. 1 as entrance zone or compartment 11, middle zone or compartment 12, and end zone or compartment 13, all of which is described in more detail below. These three zones or compartments 11, 12, and 13 are heated by a plurality respective heating means. The FIG. shows representative heaters 14, 15, and 16, although many more would normally be used. These heaters can take various forms, e.g. hot water heaters, gas heaters, electrical heaters, etc.

Also, within the pasteurizer 4 are jets 18, which are disposed near the bottom 19 of pasteurizer 4. Some of the jets are arranged transverse to major axis 7 and parallel to minor axis 8 and are spaced apart which, as explained more fully below, can form the separate zones or compartments 11, 12, and 13.

The stack 1 exits pasteurizer 4 in end zone or compartment 13 as shown by arrow 21. In one form of the process, the stacks of eggs are unloaded by a conventional destacker apparatus shown very schematically as 22, in a motion shown by arrow 23, 50 as to place the eggs 2 on conveyor 25. This is done in a gaseous atmosphere 26, which can be ambient air. In one form of the process, while the eggs are in that gaseous atmosphere and before or after being placed on conveyor 25, they are contacted, e.g., sprayed, with an antibacterial fluid 28 and that same antibacterial fluid 28 is contacted, e.g., sprayed, onto the destacking apparatus 22.

The antibacterial fluid 28 is sprayed from spray device(s) 29. While the fluid 28 could be otherwise placed onto the eggs, e.g. immersed or rolled or painted with the antibacterial fluid, spraying is preferred.

As the eggs move along conveyor 25 they are cooled in the gaseous atmosphere 26 to a temperature below which pasteurization takes place and further deterioration of the functionality is ceased. However, in order to further avoid rot recontamination during storage, the eggs 1 are contacted, e.g., sprayed, with a sealant 30 from a distribution device(s) 31. The sealant, e.g. wax, can be applied to the eggs at a point that the eggs are either warmer or colder than the temperature of the sealant, but there is an advantage in applying the sealant to the eggs while the eggs are warmer than the sealant so as to ensure an even flow of the sealant across the entire surface of the eggshell which will seal most of the pores in the eggshell, as described in more detail below.

After the sealant has set, the eggs are sent to a conventional packaging machine 33 where the eggs are packaged in a conventional manner.

The above is a summary of the overall process of the invention, and the following will provide additional details in connection with that overall process.

In the method of pasteurizing in-shell chicken eggs, the eggs are placed in a heated fluid having a temperature(s) of about 128° F. and 146° F. At temperatures below about 128° F., no substantial pasteurization takes place and at temperatures above 146° F., the decrease in functionality is simply not acceptable. There are, however, very preferred temperatures within that range, as described more fully below.

The heated fluid may be any desired fluid, since it is not the fluid that is important but the heat transfer from the fluid to the eggs. Thus, the fluid may range from steam to a fluidized solid particulate bed to microwaves traveling through air to heat lamps radiating through air to light beams passing through air but will usually be water, including glycol/water solutions, water/alcohol solutions, and the like. As a practical commercial matter, the heated fluid will normally be water, with or without additives, e.g. glycols, bactericides, salts, and the like, and for purposes of clarity and conciseness in this application, the heated fluid, when mentioned in detail, will be described as water.

The eggs are allowed to dwell in the heated fluid, e.g. water, until there is a log reduction of at least 4.6, preferably 4.75 or 4.8, log reduction of any Salmonella bacteria within the eggs. This causes a substantial but not complete pasteurization of the eggs. The eggs are then removed from the heated fluid into the gaseous atmosphere. Here, again, the particular gaseous atmosphere is not important, since the important functions are that of further pasteurizing and cooling the eggs. The atmosphere could be ozone or chlorine or bromine or any of the other food use bactericides or it could be nitrogen or oxygen, but again, for practical purposes in a commercial operation, the gaseous atmosphere will normally be air. While in the gaseous atmosphere, the eggs are contacted with an antibacterial fluid containing an antibacterial agent. Also while the eggs are in the gaseous atmosphere, the residual heat of the eggs, for example, at temperatures around 133° F., will allow the eggs to further pasteurize while cooling to below about 128 and especially below 125° F. Thus while in that gaseous atmosphere and cooling, the log reduction of the eggs will increase to about 5 logs or slightly above. The temperature of the eggs exiting the pasteurizer, the time in the gaseous atmosphere, as well as the temperature of the gaseous atmosphere, are coordinated so as to achieve at least about a 5 log reduction.

However, as briefly noted above, for institutional food use, where partial precooking of the eggs is desired in order to shorten the time for complete cooking of the eggs, e.g., scrambled or sunny side up eggs, and/or improve the safety of the eggs, the log reduction of the eggs exiting the pasteurizer may be as high as about 8, 9, or 12 logs. At such log reductions, some thickening of the eggs takes place, but on the other hand and importantly, the eggs remain fluid. Therefore, in a fast food restaurant, for example, the eggs may be cracked onto a griddle in the usual manner and fried, sunny side up, for immediate serving. However, since the eggs have at least a 6 or 8 or 12 log reduction, they are extremely safe for commercial restaurant customers or patients in a health care institution and may be served sunny side up without any substantial fear of an adverse result. This is especially useful in nursing homes where any Salmonella infection could be very dangerous to older people and the soft cooking of raw eggs is no longer allowed by the FDA. In addition, the eggs with this higher log reduction will cook in about one-half of the time of a fresh egg. This is of exceeding importance to commercial restaurants, e.g., fast food restaurants, so that they may be assured that eggs may be served, for example, sunny side up, without adverse results, and, in addition, the eggs can be very quickly cooked for serving. This result is possible because the chilling bath is eliminated, according to the present invention.

As noted above, it was also discovered that the time required for the eggs 2 in pasteurizer 4 to achieve at least a 4.6 log reduction of Salmonella is substantially shortened when the heated fluid in the pasteurizer is at different temperatures. This is based on the discovery that as the eggs are heated from ambient temperatures to above the pasteurization temperature of at least 128° F., for example to 133 F., very little loss of functionality occurs, generally directly in relation to the time/temperature above about 128° F., until a 1 log reduction is achieved. Thereafter, the rate of deterioration of functionality caused by heat upon the egg protein is less in a temperature range of about 133 to 134.5° F. until about a 4 log reduction is reached. Thus, at this temperature range, something of a functionality plateau is reached. After the above mentioned 4 logs reduction, a minimum loss of functionally will occur during the next plateau of 4 to 4.6 logs reduction, even with increased temperatures ranging from 135 to 138° F. With the discovery of these plateaus, it became possible to increase log reductions through the use of the above identified temperature ranges with minimum loss of functionally.

With this discovery, it was found that the time required for pasteurizing eggs in a water bath could be substantially shortened if, basically, the eggs in an entrance zone or compartment 11 are subjected to water at a higher temperature(s) and then subjected to a lower temperature(s) in zone or compartment 12 and then to a higher temperature (s) in end zone or compartment 13. Since the eggs 2 in stack 1 are moving in the directions of arrows 3 and 9 and enter the pasteurizer 4, generally, at ambient temperatures or less, e.g. down to refrigeration temperatures (40 or 45° F.), the heat transfer from the heated fluid 34 (FIG. 1) to the eggs 2 is much greater when the temperature differential between the temperature of the eggs and the temperature of the heated fluid 34 is greater. This can very quickly heat the eggs up to near pasteurization temperature without deterioration of the functionality of the eggs because the heat transfer into the eggs is rapid enough to avoid outer albumin damage. In that higher temperature zone, or entrance zone or compartment 11, the eggs have not reached the 1 log reduction plateau, as noted above By using that higher temperature differential between the eggs and heated fluid, the eggs are brought to a desired pasteurization temperature in an accelerated time. Thereafter, the eggs are passed into the middle zone or compartment 12 where the temperature(s) of that zone or compartment is less than that of entrance zone or compartment 11, e.g. 130° F. to less than 135° F. and especially 133° F. less than 135° F. The eggs can be heated at that temperature for some time so as to effect higher pasteurization without substantial reduction of functionality until the second plateau at about 4 logs is reached. In this connection, it was recognized that in order to provide the public with a safe and low cost pasteurized egg, the pasteurizer water temperature range and the time of exposure of the eggs to the water must be related to the maximum rate of heat transfer that the eggs could provide without damage to the albumin protein.

As noted above, according to the present invention the chiller is eliminated, and the residual heat of the eggs is utilized for further pasteurization of the eggs in the gaseous atmosphere after removal from the pasteurizer. It is highly advantageous to heat the eggs to a temperature higher than the temperature of middle zone or compartment 12 so as to increase the residual heat. Therefore, in the end zone or compartment 13, the temperature is again raised to, for example, 135–138° F., so as to provide more residual heat to the eggs in the gaseous atmosphere. The time, however, is quite short in that end zone or compartment and even though the eggs will have exceeded the 4 log reduction to reach the next plateau, since the time is short, very little additional deterioration of functionality occurs.

Of course, the pasteurizer could be divided into two zones or more then three zones as described above, but two zones are less efficient and more then three zones becomes unnecessarily complex. Therefore the division into three zones, i.e., the higher temperature entrance zone, the desired pasteurizing temperature middle zone, and the additional residual heat exit zone are the preferred forms of a multiple temperature pasteurization of eggs.

In this latter regard is has been found that the temperature of the heated fluid is preferably about 139° F. to 146° F. as the first temperature of the heated fluid and about 130° F. to less than 135° F. as the second temperature and about 135° F. to 138° F. as the third. Of course, when the heated fluid is water and the water is contained in the elongated tank 4, through which the eggs transverse the tank from the entrance of the tank to the middle zone of the tank and exit from the exit zone of the tank, those temperatures correspond to the entrance zone compartment 11, the middle zone compartment 12 and end zone compartment 13. It should be noted that the above mentioned patent relates processing to the center of the yoke temperature. That temperature will be continually changing as the eggs traverse the tank with the three zones or compartments.

There are several ways of maintaining the temperatures of the zones or compartments. One way is to have the heat input, and hence temperature, of entrance heater 14, middle heater 15 and end heater 16 different, i.e., a higher temperature in entrance heater 14, a lower temperature in middle heater 15 and, again, a higher temperature in end heater 16. These different temperatures of the heaters will produce, for example, three zones of different temperatures throughout the water of the pasteurizing bath as stack 1 of the eggs 2 (and succeeding stacks) transverse along the tank 4 in the direction of major axis 7. This is because as the eggs in the stacks transverse the tank, a natural convection from the bottom 19 of tank 4 to the top 35 of tank 4 occurs This creates a form of vertical convection. Generally, the heaters of the tank will be disposed near the bottom 19 of tank 4.

Thus, the individually controlled heaters heat the water (heated fluid 34) at the bottom 19 of tank 4 and that water 34 contacts the eggs 2 in each of the stacks as they serially pass through the tank and the water rises generally vertically toward the top 35 of tank 4. This effectively causes a circular convection motion from top to bottom to top again, etc., in a localized zone, e.g. zones 11, 12, and 13. The distinct temperatures of the zones are aided by a plurality of jets 18 arranged near the bottom 19 of tank 4 through which a jet fluid is passed from the jets into the water of the tank. This jet fluid rises vertically in the water and is very useful in maintaining more uniform temperatures along a vertical direction of the tank. The jet fluid may be a gas or a liquid, such as air or water. These jets, therefore, aid in the vertical convection of water in a zone so as to somewhat maintain a temperature differential between the zones.

However, that temperature differential is not a sharp differential and somewhat graduates from one zone to the next zone. This is not necessarily undesirable and this will produce very satisfactory pasteurization of eggs. However, in certain situations, it is important to pasteurize the eggs to as precise a desired log reduction as possible and in the shortest possible time. In that case, better control of the pasteurization to a precise log reduction can be achieved if the zones are more distinct. These zones can be made more distinct when some of the jets 18 are arranged transverse to the major axis 7 and parallel to minor axis 8. One series of transverse jets is spaced apart along the major axis from another series of transverse jets. Since the jet fluid passing through the jets rises vertically in the water and to at least near the top of the water, this provides a jet fluid wall in the water at each of the spaced apart series of jets. These jet fluid walls form jet fluid walled compartments 11, 12, and 13 between the jet fluid walls. By this arrangement at least two jet fluid walled compartments along the major axis can be maintained at fairly distinct different temperatures. In the preferred embodiment, of course, three compartments are used for the three different temperatures, i.e., the higher entrance temperature, lower or middle temperature and higher exit temperature.

The jet fluid can be simply recirculated water from the pasteurizing tank or it can be water separately heated and passed through the jets 18. Alternatively, the jet fluid may be air that is separately heated and passed through the jets 18. Where the jet fluid is the water from the pasteurizer, and is simply recirculated through the jets, that water will be essentially at the temperature of the particular compartment, since the heated fluid in the tank is heated by the series of heaters, e.g., heaters 14, 15, and 16, disposed in the tank. However, in practice, a number of heaters, e.g., 40 to 100, may be used.

In addition, near the bottom 19 of tank 4 is normally disposed a second series of jets through which pass a jet fluid for perturbation of the water, as mentioned above, so as to homogenize the temperature of the water within each compartment.

Since the stacks 1 of eggs 2, usually, pass through the pasteurizer tank 4 at a constant speed, the time that the eggs in a stack 1 spend at the different temperatures depends upon the length of the compartments 11, 12, and 13 in tank 4. Those lengths can vary, depending upon the desired log reduction of the eggs exiting the pasteurizing tank and the temperatures within each of the three compartments, i.e., the entrance compartment, middle compartment and exit compartment. However, generally speaking, the length along the major axis 7 of the tank is from about 0.1 to 0.3 the length of the tank for the entrance compartment, from about 0.3 to 0.7 the length of the tank for the middle compartment, and from about 0.1 to 0.3 the length of the tank for the exit compartment. Preferably, these ratios are, respectively, 0.1 to about 0.2, 0.2 to about 0.6, and 0.1 to about 0.2 These ratios of the length of the compartment are particularly useful for the temperatures of the compartments noted above, i.e., from 139° F. to 146° F. for the entrance compartment, from 130° F. to less than 135° F. for the middle compartment and from 135° F. to 138° F. for the exit compartment. Preferably however, the length of the entrance compartment is from about 0.3 to about 0.35, the middle compartment is from about 0.5 to 0.6 and the exit compartment is from about 0.2 to 0.26, and the respective temperature ranges are from about 141° F. to 143° F., 132° F. to less than 135° F., and 136° F. to 138° F. The most preferred temperatures are, respectively, 142, 133, and 137 degrees F. However, these temperatures and/or the ratios of the lengths of the compartment can vary depending upon the log reduction of Salmonella in any eggs that is desired and, as noted above, that log reduction can be from as little as 4.6 to 12.0 as achieved within the pasteurizing tank itself. Log reductions will also depend on the speed of the stack of the eggs through the pasteurizing tank.

As a general comparison of the improvement of the invention as thus far described, and a more conventional process, where the pasteurizing tank is at a constant temperature of, for example, 133° F., the dwell time at that temperature to reach a 5 log reduction, as required in the prior process, was close to 64 minutes and, even with ideal results, at least about 63 minutes. If the process is carried out with only two zones or compartments, e.g. one entrance compartment at 136° F. and one compartment at 133° F., the process takes about 52 to 56 minutes. However, with the present invention having three zones or compartments at the most preferred temperatures, noted above, the process can be carried out in as little as 39 to 41 minutes. Thus, as compared with the prior process, the present process can be carried out in considerably less time. This is a very substantial improvement from a commercial point of view.

The antibacterial agent contained in the antibacterial fluid 28 can be any one of the FDA Food Use approved bacteriacides, including chlorine, bromine, ozone, hydrogen peroxide and quaternary ammonium compounds. All of these are well known and need not be described in detail. The antibacterial fluid can be any fluid which can contain those bacteriacides, e.g. air, nitrogen, alcohol, etc., but preferably the antibacterial fluid is water. The antibacterial agent used in this application and in the applications described in more detail below, i.e., the application of contact with equipment and the application of a sealant, all use the antibacterial agent in the concentrations prescribed by the FDA. For example, the specific quaternary ammonium compound described more fully below is used in a concentration of about 100 parts per million. The eggs 2 can be contacted with the antibacterial fluid 28 in any desired manner, but it is most convenient that the antibacterial fluid is sprayed onto the eggs, as shown in FIG. 1. Also, as shown in FIG. 1, the antibacterial fluid is contacted, e.g. sprayed, onto any mechanical equipment 22, e.g. the destacker handling the eggs, subsequent to the eggs exiting the heated fluid. More preferably, the antibacterial fluid is contacted (sprayed) on the mechanical equipment 22 prior to the eggs contacting the mechanical equipment after exiting the heated fluid of pasteurizer 4. Thus, the mechanical equipment contacting the eggs after the eggs exit the heated fluid has been contacted with the antibacterial fluid so that any bacteria on the mechanical equipment is either killed or very substantially reduced by the antibacterial fluid. Thus, since the equipment and the eggs are sprayed with antibacterial fluid, any rot and/or pathogenic bacteria in the gaseous atmosphere which is sucked into the egg, especially between the membrane and the inside of the shell, will encounter the antibacterial fluid and be either killed or reduced to such low numbers that rot or other undesired results will not occur within the eggs. It is preferred that the mechanical equipment handling the eggs and the eggs are sprayed with antibacterial fluid before the eggs reach a temperature less than about 100° F. At that temperature the eggs have cooled sufficiently that little additional material will be sucked into the eggs during further cooling and, thus, the antibacterial barrier discussed below will not be substantially achieved. Also, by that temperature, the sealant should be applied.

In this latter regard, after contacting the eggs (and preferably the mechanical equipment) with the antibacterial fluid, the eggs are contacted with an egg pore sealant, as briefly noted above. Preferably that egg pore sealant has an antibacterial agent therein and, again, the antibacterial agent is a FDA Food Use approved bactericide such as chlorine, bromine, ozone, hydrogen peroxide and quaternary ammonium compounds. That sealant 30 (FIG. 1) is contacted, preferably sprayed, from distribution device(s) 31 onto the eggs while the eggs are on the handling equipment, e.g. conveyor 25.

The pore sealant can be any food grade sealant, but preferably is food grade polymers or waxes or soluble proteins, e.g., gelatin. For aesthetic purposes, it is preferred that the sealant is at least transparent when applied to the eggs. Since the usual waxes meet these requirements, wax is a preferred sealant.

When the sealant is sprayed onto the eggs, the sealant is preferably in a heated sealant liquid form and preferably at a temperature above the temperature of the eggs being contacted with the sealant so as to cause the sealant to rapidly spread along the surfaces of the eggs.

As also briefly noted above, during pasteurization the natural protective sealant of the eggs is substantially lost during the pasteurization and the pores of the eggshell are open for entrance of materials during cooling. While it is substantially impossible to ensure that all of the opened pores on the eggshell are closed, by careful spraying of the sealant it can be assured that the amount of sealant which remains on the eggs after spraying is at least equal to 50% of the natural egg pore sealant removed from the eggs during the dwell of the eggs and the heated fluid in pasteurization and preferably that amount is at least 70%, e.g. 85 or 90% or better.

As briefly discussed above, the present process is shortened by taking the eggs out of the pasteurizer before a 5 log reduction is reached, contrary the practice of the prior art. The residual heat of the eggs causes additional pasteurization while the eggs are in the gaseous atmosphere and that additional pasteurization will cause the eggs to increase in the log reduction to at least 5. The time required for the dwell of the eggs in the gaseous atmosphere to reach that increased log reduction will depend upon the temperature of the eggs exiting the pasteurizer, the temperature of the gaseous atmosphere, the temperature and amount of the antibacterial fluids sprayed onto the eggs, as well as the size of the egg. However, generally speaking, a dwell time of about 1.5 to 3 minutes in the gaseous atmosphere will be satisfactory to increase the log reduction from about 4.6 or 4.8 to the required 5 log reduction. That time, however, is not necessarily wasted time. With the present invention, during that dwell time, the mechanical handling equipment and eggs are sprayed with the antibacterial fluid, and, in some embodiments the eggs are also at least partially destacked from stack 1 or placed on conveyor 25 or in a packaging machine 33, which must be done in any case in order that the eggs may be appropriately packaged.

Thus, in the present process for pasteurizing in-shell chicken eggs, the eggs are placed in the heated fluid with a temperature between 128° F. and 146° F. and the heated fluid has a first temperature of 139° F. to 146° F., and a second temperature of 130° F. to less than 135° F., and a third temperature of 135° F. to 138° F. Those first, second and third temperatures of the heated fluid are maintained in separate zones of the heated fluid and the eggs pasteurize in the first, second and third temperatures in a time period which causes at least a 4.6 or at least a 4.75 or at least a 4.8 log reduction in any Salmonella bacterial in the eggs. The eggs are thereafter removed from the heated fluid and immediately passed to the gaseous atmosphere where the eggs are allowed to cool, and the eggs will reach the required 5 log reductions during that cooling in the gaseous atmosphere. While the eggs are in the gaseous atmosphere, they are contacted with the antibacterial fluid containing an antibacterial agent. Further, preferably after the eggs are contacted with the antibacterial fluid, the eggs are contacted with the egg pore sealant, which preferably has an antibacterial agent.

In tests run for rot activity of eggs pasteurized according to the most preferred process as described above, eggs have been kept in cold storage, e.g. at a temperature of about 40° F. to 45° F., for up to six months without evidence of rot in the eggs. This is compared to approximately a maximum of 21 days before incidents of rot occurred in eggs processed according to the prior process, as described above. In limited but yet meaningful long term refrigerated storage tests, eggs have remained rot-free for up to 1 year. During such long term storage there are changes in the eggs, in terms of functionality, as described in the above-identified patent, but the eggs are not made un-saleable because of incidences of rot. This is, accordingly, a very substantial advance in the art.

Figure 2:
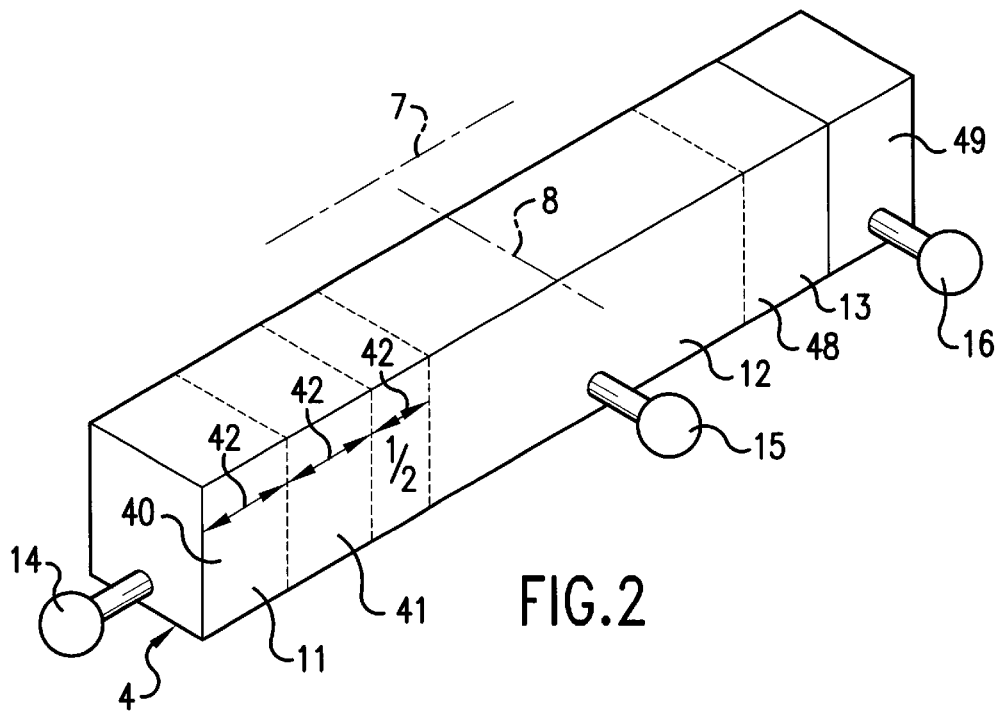
FIG. 2 is an enlarged diagrammatic view of the pasteurizer of FIG. 1.

FIG. 2 shows a typical pasteurizing tank 4 for carrying out the present process and being shown in more detail. Typically, for example, the tank might well be from 25 to 40 feet (8 to 13 meters) long in the major axis 7 and 3 to 6 feet wide (1 to 3 Meters) in the minor transverse axis 8 with a height of about 3 to 6 feet (1 to 3 meters). Such a tank might be divided into from 8 to 15 positions, with three positions 40, 48 and 49 being shown in FIG. 2. The Figure shows details of two and one-half positions 41. A typical the tank may have 11 positions. While the stack 1 of eggs 2 (FIG. 1) might pass continuously through tank 4, without stopping or interruption, this would require a much longer tank than necessary to achieve the correct dwell times at the correct temperatures. Therefore, normally, each stack 1 of eggs 2 will dwell in the positions for certain lengths of time before moving to the next position or positions. For example, each stack of eggs might dwell in a position for 4 minutes before moving to the next position or positions. Accordingly, if zones 11, 12, and 13 have temperatures of, for example, 142, 133 and 137° F., respectively, then the dwell time in zone 11 might require two and one-half positions, 40, 41, as shown in FIG. 2 by arrows 42. The number of positions, for example, in zone 11 will be determined by the temperature of the eggs entering zone 11, the temperature(s) of the zone, and the dwell time of the eggs in that zone. However, generally speaking, it is desired that there be a substantial differential between the temperature of the water and the eggs in zone 11, as explained above. For example a differential of from 4 to 10° F., e.g. somewhere in the range of 6° F. or so. This will provide a very fast heating of the eggs to pasteurization temperatures, e.g., about 128° F., but without any substantial deterioration of the functionality of the eggs. Thereafter, the eggs are moved to zone 12, for example, at 133° F. and zone 12 would have a number of positions therein, since about 133° F. is the most preferred pasteurization temperature. This will allow more thorough pasteurization (increase in log reductions) with the least possible loss of functionality of the eggs. Zone 13, however, might have positions 48, 49 (FIG. 2). Those two positions are required in view of the speed of the stacks 1 through the pasteurizer 4, as noted above, to reach a higher temperature for residual heat of the eggs to achieve additional pasteurization after the eggs pass from the pasteurizer 4 to the gaseous atmosphere. However, here again, the temperature differential in zone 13 between the eggs and the water should not be too great, or otherwise some deterioration of the functionally of the eggs might take place Thus, as noted above, the temperature of zone 13 should be about 135° F. to 138° F. and more preferably about 137° F.

Figure 3:
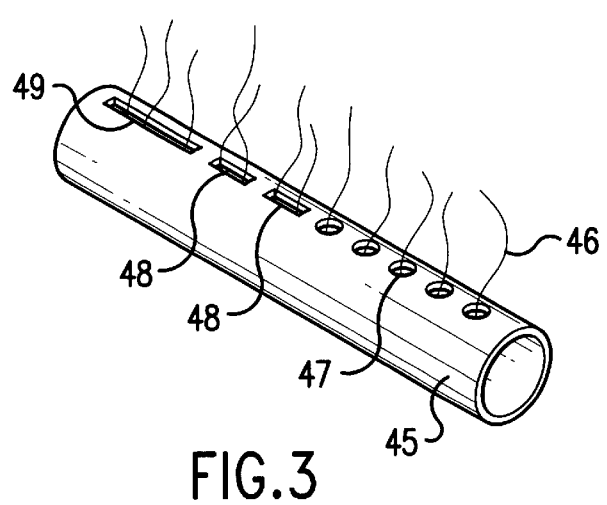
FIG. 3 is a diagrammatic view of an apparatus for creating fluid jets in a pasteurizing liquid.

The jets 18 (see FIG. 1) can be provided by a variety of arrangements, such as those shown in FIG. 3. In that Figure, a conduit passes the jet fluid 46, which may be a gas or a liquid, as explained above, into the heated fluid 34 (see FIG. 1) by way of apertures 47 or slots 48 or a slit 49, which slit would extend across the entire length of conduit 45.

The pressure of the jet fluid 46 within conduit 45 and depending upon the jets involved, whether apertures 47, slots 48 or slit 49, must be sufficient that the jet fluid rises fairly rapidly toward the top 35 of tank 4. This not only is necessary to achieve the homogenization of temperatures within a zone, as explained above, but also to facilitate the formation of temperature zones 11, 12 and 13. Also, when the jets are sufficient to form the jet fluid walls described above, those jets form more of a compartment than a zone and the temperature differential between the compartments is more distinct. To achieve this, as explained above, there are a series of jets transverse to major axis 7 and parallel to minor axis 8 of the tank so as to form thereinbetween temperature compartments.

Figure 4:
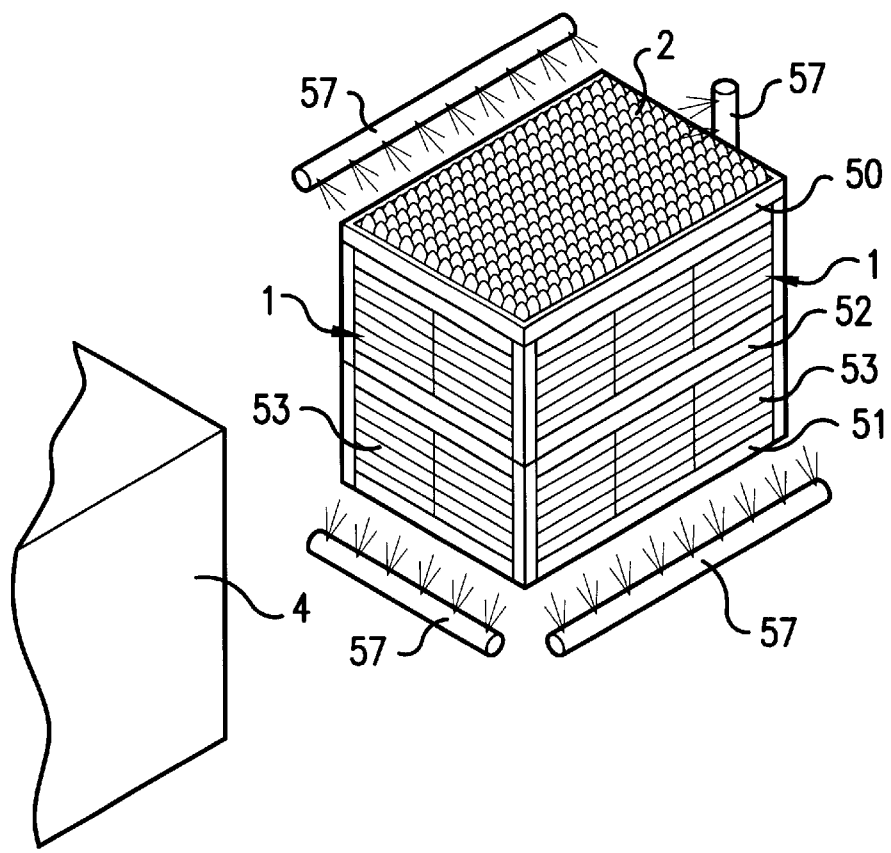
FIG. 4 is an illustration of one method of contacting the eggs with an antibacterial fluid.

FIG. 4 shows an additional manner of applying the antibacterial fluid to the eggs. As shown in that Figure, stacks 1 of eggs 2 are contained in an open carrier 50. The carrier 50 may have, for example, three stacks across and two stacks deep on a bottom shelf 51 and the same amount on a top shelf 52, as shown in that Figure. Each stack 2 may have 5 or 6 flats 53, with 2 to 4 dozens of eggs on each flat. After the so loaded carrier is removed from the pasteurizer 4, the carrier is suspended beyond and above the pasteurizer and the eggs on the carrier are sprayed with a mist of antibacterial fluid from a plurality of sprayers 57, four of which are shown in the Figure, but in practice many more would be used, e.g. 6 to 20. The mist of antibacterial fluid is at temperature and the amount is such as to not substantially decrease the temperature of the eggs so that the eggs can continue to pasteurize as explained above, but the amount is sufficient to provide substantial kill of rot bacteria while the eggs dwell in the gaseous atmosphere, air in this case. Additional antibacterial fluid can be applied to the eggs during subsequent processing as explained above, e.g., during destacking or candling or other conventional handling and packaging processes.

This will ensure that the antibacterial fluid is sucked into the eggs and will reside between the egg membrane and the inside of the shell. This will fully protect the eggs from entrance of viable rot bacteria until the eggs are further protected by the application of the egg sealant. In this regard, a preferred bactericide is the FDA Food Use approved quaternary ammonium compound, EPA No. 1677-43(alkyl dimethyl benzyl ammonium chloride). This compound is fugitive in the sense that it breaks down to harmless compounds in a relatively short time. However, the time is long enough for the eggs to cool and then be coated with the eggs sealant. Thus an important feature of the invention is that of providing a pasteurized egg having an antibacterial fluid disposed between an egg membrane and an inside of an egg shell.

Further in this regard, an important feature of the invention is that of providing apparatus for pasteurizing in shell chicken eggs having a support for the eggs and an application device in proximity to the support for applying to the eggs, which are at least partially pasteurized, an antibacterial fluid.

The invention as described above is intended to be embraced by the spirit and scope of the following claims.

What is claimed:

1. A method of pasteurizing in-shell chicken eggs, comprising:
   (1) placing the eggs in a heated fluid having different temperatures of between about 128° F. and 146° F.;
   (2) allowing the eggs to dwell in the heated fluid until there is a log reduction of at least 4.6 of Salmonella bacteria within the eggs;
   (3) removing the eggs from the heated fluid and into a gaseous atmosphere where the eggs are allowed to cool; and
   (4) contacting the eggs with an antibacterial fluid containing an antibacterial agent.

2. The method of claim 1, wherein the log reduction is about above 4.75.

3. The method of claim 2, where the log reduction is about 6 to 12 logs.

4. The method of claim 1, wherein a first temperature of the heated fluid is about 139° F. to 146° F., and a second temperature of the heated fluid is about 130° F. to less than 135° F. and a third temperature of the heated fluid is about 135° F. to 138° F.

5. The method of claim 1, wherein the heated fluid is water and the water is contained in an elongated tank through which the eggs traverse from an entrance end of the tank to a middle zone of the tank and to an exit end of the tank.

6. The method of claim 5, wherein near a bottom of the tank a plurality of jets are dispersed through which a jet fluid is passed from the jets into the water.

7. The method of claim 6, wherein some of the jets are arranged transverse to a major axis of the tank and one series of the transverse jets is spaced apart along the major axis from another series of the transverse jets.

8. The method of claim 7, wherein the jet fluid rises vertically in the water and to at least near a top of the water to provide a jet fluid wall in the water near each of the spaced apart series of jets, and between two such jet fluid walls a jet fluid walled compartment is formed.

9. The method of claim 8, wherein there are at least two jet fluid walled compartments along the major axis and at least two of the compartments are maintained at different temperatures.

10. The method of claim 9, wherein the jet fluid is a gas or liquid.

11. The method of claim 10, wherein the gas is air and the liquid is water.

12. The method of claim 9, wherein at least three compartments are maintained at different temperatures.

13. The method of claim 12, wherein there are an entrance compartment, a middle compartment, and an exit compartment and the length along the major axis of the tank of the entrance compartment is from 0.1 to 0.3 the length of the tank, the middle compartment is from 0.3 to 0.7 the length and the exit compartment is from about 0.1 to 0.3 the length and the temperature within the entrance compartment is from 139° F. to 146° F., the middle compartment is from 132° F. to less than 135° F. and the exit end compartment is from 135° F. to 138° F.

14. The method of claim 13, wherein the length of the entrance compartment is from about 0.1 to about 0.2, the middle compartment is from about 0.2 to 0.6 and the exit compartment from about 0.1 to 0.2 and the respective temperatures are from about 141° F. to 143° F., 133° F. to 134.5° F. and 136° F. to 139° F.

15. The method of claim 1, wherein the antibacterial agent is any one of FDA Food Use approved bacteriacides.

16. The method of claim 15, wherein the bacteriacide is selected from chlorine, bromine, ozone, hydrogen peroxide and quaternary ammonia compounds.

17. The method of claim 15, wherein the antibacterial fluid is water.

18. The method of claim 1, wherein the antibacterial fluid is contacted with the eggs and is also contacted with mechanical equipment handling the eggs subsequent to the eggs exiting the heated fluid.

19. The method of claim 18, wherein the antibacterial fluid is sprayed onto the eggs and onto the mechanical equipment and prior to the eggs contacting the mechanical equipment.

20. The method of claim 1, wherein after contacting the eggs with the antibacterial fluid the eggs are contacted with an egg pore sealant.

21. The method of claim 20, where the pore sealant is selected from food grade polymers, waxes and soluble proteins.

22. The method of claim 21, wherein the sealant is wax.

23. The method of claim 20, wherein the sealant is sprayed onto the eggs.

24. The method of claim 20, wherein after contacting the eggs with the sealant, an amount of sealant which remains on the eggs is at least equal to 90% of natural egg pore sealant removed from the eggs during the dwell of the eggs in the heated fluid.

25. The method of claim 1, wherein the eggs exit the heated fluid with a log reduction of about at least 4.6 and while the eggs are in the gaseous atmosphere residual heat in the eggs increases the log reduction to at least 5.

26. The method of claim 25, wherein the eggs are in the gaseous atmosphere for about 1.5 to 3.5 minutes.

27. A method of pasteurizing in-shell chicken eggs comprising:

(1) placing the eggs in a heated fluid having temperatures between about 128° F. and 146° F. so as to heat the eggs, said heated fluid having a first temperature of about 139° F. to 146° F., a second temperature from about 130° F. to less than 135° F. and a third temperature from about 135° F. to 138° F., and wherein the first, second, and third temperatures of the heated fluid are maintained in separate zones of the heated fluid;

(2) allowing the eggs to pass through the first, second, and third temperatures in a time period which causes at least a log reduction of 4.6 of any Salmonella bacteria within the eggs; and (3) removing the eggs from the heated fluid to a gaseous atmosphere and allowing the eggs to cool.

28. The process of claim 27, wherein while the eggs are in the gaseous atmosphere, the eggs are contacted with an antibacterial fluid containing an antibacterial agent.

29. The process of claim 28, wherein after the eggs are contacted with the antibacterial fluid, the eggs are contacted with an egg pore sealant.

30. The method of claim 27, wherein the eggs remain in the gaseous atmosphere until the eggs reach a final log reduction of at least about 5.

31. The method of claim 30, wherein a final log reduction is up to about 12.

32. The method of claim 27, wherein the heated fluid is water and the water is contained in an elongated tank through which the eggs traverse from an entrance end of the tank to a middle zone of the tank and to an exit end of the tank and near a bottom of the tank a plurality of jets are dispersed through which a jet fluid is passed from the jets into the water.

33. The method of claim 32, wherein some of the jets are arranged transverse to a major axis of the tank.

34. The method of claim 33, wherein one series of the transverse jets is spaced apart along a major axis from another series of transverse jets.

35. The method of claim 34, wherein the jet fluid rises vertically in the water and to at least near a top of the water to provide a jet fluid wall in the water near each of the spaced apart series of jets, and between two such jet fluid walls a jet fluid walled compartment is formed.

36. The method of claim 35, wherein there are at least three jet fluid walled compartments along the major axis and the three compartments are maintained at the first, second and third temperatures.

37. The method of claim 36, wherein the jet fluid is a gas or liquid.

38. The method of claim 36, wherein there are an entrance compartment, a middle compartment and an exit compartment and the length along the major axis of the tank of the entrance compartment is from 0.1 to 0.3 the length of the tank, the middle compartment is from 0.3 to 0.7 the length and the exit compartment is 0.1 to 0.3 the length.

39. The method of claim 38, wherein the length of the entrance compartment is from about 0.1 to about 0.2, the middle portion is from about 0.2 to 0.6 and the exit is from about 0.1 to 0.2 and the respective temperatures are from about 141° F. to 143° F., 133° F. to 135° F. and 136° F. to 137° F.

40. The method of claim 27, wherein the antibacterial agent is any one of FDA Food Use approved bactericides.

41. The method of claim 27, wherein the antibacterial fluid is contacted with the eggs and is also contacted with mechanical equipment handling the eggs subsequent to the eggs exiting the heated fluid.

42. The method of claim 41, wherein the eggs and mechanical equipment are sprayed with the antibacterial fluid and the mechanical equipment includes egg destacking equipment.

43. The method of claim 28, wherein the pore sealant is selected from food grade polymers, waxes and soluble proteins.

44. The method of claim 43, wherein the sealant is wax.

45. The method of claim 29, wherein the sealant is sprayed onto the eggs.

46. The method of claim 27, wherein while the eggs are in the gaseous atmosphere residual heat in the eggs increases the log reduction to at least 5.

47. The method of claim 46, wherein the eggs are in the gaseous atmosphere for about 1.5 to 3.5 minutes.

48. The method of pasteurizing in shell chicken eggs, comprising:
   (1) passing the eggs through a tank containing a heated fluid at different temperatures in separate zones of the heated fluid, said different temperatures being from about 139° F. to 146° F. in a first zone, from about 130° F. to less than 135° F. in a second zone and from about 135° F. to about 138° F. in a third zone; and
   (2) removing the eggs from the heated fluid when the eggs have reached at least about 4.6 log reduction of any Salmonella within the eggs.

49. The method of claim 48, wherein the log reduction is about 4.8.

50. The method of claim 46, wherein the log reduction is up to 12.

51. The method of claim 48, wherein the heated fluid is water and the eggs traverse the tank from an entrance end to a middle zone of the tank and to an exit end of the tank, and the first, second and third temperature zones corresponds, respectively, thereto.

52. The method of claim 51, wherein near a bottom of the tank a plurality of jets is dispersed through which a jet fluid is passed from the jets into the water.

53. The method of claim 52, wherein some of the jets are arranged transverse to a major axis of the tank.

54. The method of claim 53, wherein one series of the transverse jets is spaced apart along the major axis from another series of transverse jets.

55. The method of claim 54, wherein the jet fluid rises vertically in the water and to at least near a top of the water to provide a jet fluid wall in the water near each of the spaced apart series of jets, and between two such jet fluid walls a jet fluid walled compartment is formed.

56. The method of claim 55, wherein there are at least two walled compartments along the major axis and the at least two walled compartments are maintained at the different temperatures.

57. The method of claim 52, wherein the jet fluid is a gas or liquid.

58. The method of claim 57, wherein the gas is air and the liquid is water.

59. The method of claim 56, wherein there are an entrance compartment, a middle compartment and an exit compartment and the lengths along the major axis of the tank of the entrance compartment is from 0.1 to 0.3 the length of the tank, the middle compartment is from 0.3 to 0.7 the length and the exit compartment is from 0.1 to 0.3 the length and the temperature within each of the compartments corresponds to the different temperatures, respectively.

60. The method of claim 59, wherein the length of the entrance compartment is from about 0.1 to about 0.2, the middle compartment is from about 0.2 to 0.6 and the exit compartment is from about 0.1 to 0.2 and the respective temperatures are from about 141° F. to 142° F., 133° F. to less than 135° F. and 136° F. to 137° F.

61. The method of claim 48, wherein after the eggs are removed from the heated fluid, the eggs are passed into a gaseous atmosphere.

62. The method of claim 61, wherein after the eggs pass into the gaseous atmosphere the eggs are contacted with an antibacterial fluid containing an antibacterial agent.

63. The method of claim 62, wherein the antibacterial agent is any one of FDA Food Use approved bactericides.

64. The method of claim 62, wherein the antibacterial fluid is contacted onto the eggs and is also contacted onto mechanical equipment handling the eggs.

65. The method of claim 64, wherein the antibacterial fluid is sprayed onto the eggs and the mechanical equipment prior to the eggs contacting the mechanical equipment.

66. The method of claim 62, wherein after contacting the eggs with the antibacterial fluid, the eggs are contacted with an egg pore sealant.

67. The method of claim 66, wherein the pore sealant is selected from food grade polymers, waxes and soluble proteins.

68. The method of claim 66, wherein the sealant is at least translucent when applied to the eggs.

69. The method of claim 66, wherein the sealant is wax.

70. The method of claim 66, wherein the sealant is sprayed onto the eggs.

71. The method of claim 66, wherein after contacting the eggs with the sealant, the amount of sealant which remains on the eggs is at least equal to 85% of natural egg pore sealant removed from the eggs during the dwell of the eggs in the heated fluid.

72. The method according to claim 71, wherein the amount is at least 90%.

73. The method of claim 61, wherein while the eggs are in the gaseous atmosphere residual heat in the eggs increases the log reduction to at least about 5.

74. The method of claim 73, wherein the eggs are in the gaseous atmosphere for about 1.5 to 3.5 minutes.

* * * * *